United States Patent
Saylor et al.

(10) Patent No.: US 9,313,206 B1
(45) Date of Patent: *Apr. 12, 2016

(54) ELECTRONIC SIGNATURES

(71) Applicant: MicroStrategy Incorporated, Vienna, VA (US)

(72) Inventors: Michael J. Saylor, Vienna, VA (US); Hector Vazquez, Ashburn, VA (US); Peng Xiao, McLean, VA (US); Andrew T. Foy, Arlington, VA (US)

(73) Assignee: MicroStrategy Incorporated, Vienna, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/600,796

(22) Filed: Jan. 20, 2015

Related U.S. Application Data

(63) Continuation of application No. 13/941,636, filed on Jul. 15, 2013, now Pat. No. 8,966,597.

(60) Provisional application No. 61/731,795, filed on Nov. 30, 2012.

(51) Int. Cl.
    H04L 29/06  (2006.01)

(52) U.S. Cl.
    CPC .............. *H04L 63/101* (2013.01); *H04L 63/08* (2013.01)

(58) Field of Classification Search
    None
    See application file for complete search history.

(56) References Cited

U.S. PATENT DOCUMENTS

| | | | |
|---|---|---|---|
| 7,571,472 B2 | 8/2009 | Royer | |
| 7,607,018 B2 | 10/2009 | Baxter | |
| 8,086,859 B2 | 12/2011 | Pavlicic | |
| 8,474,025 B2 | 6/2013 | Royer | |
| 8,620,676 B2 | 12/2013 | Geller | |
| 8,621,222 B1 | 12/2013 | Das | |
| 8,650,038 B2 | 2/2014 | Peirson | |
| 8,966,597 B1 * | 2/2015 | Saylor et al. | 726/5 |
| 2002/0038290 A1 | 3/2002 | Cochran | |
| 2002/0143704 A1 | 10/2002 | Nassiri | |
| 2012/0166309 A1 | 6/2012 | Hwang | |
| 2013/0297943 A1 | 11/2013 | Hackler | |

OTHER PUBLICATIONS

U.S. Notice of Allowance for U.S. Appl. No. 13/941,636 dated Nov. 12, 2014, 15 pages.

U.S. Appl. No. 13/941,636, Electronic Signatures, filed Jul. 15, 2013, 52 pages.

\* cited by examiner

*Primary Examiner* — David Pearson
(74) *Attorney, Agent, or Firm* — Fish & Richardson P.C.

(57) ABSTRACT

A method, comprising: storing, at a server device, an electronic resource; receiving, at the server device and from a client device associated with a first user, a request on behalf of the first user to access the electronic resource; responsive to receiving the request on behalf of the first user to access the electronic resource, enabling the client device associated with the first user to access the electronic resource; while the client device associated with the first user is accessing the electronic resource, receiving, at the server device and from the client device associated with the first user, a request to validate a representation of a credential purported to represent another user received by the client device; validating the received representation of the credential as representing a second user; and responsive to validating the received representation of the credential, enabling the first user to electronically sign the electronic resource.

20 Claims, 8 Drawing Sheets

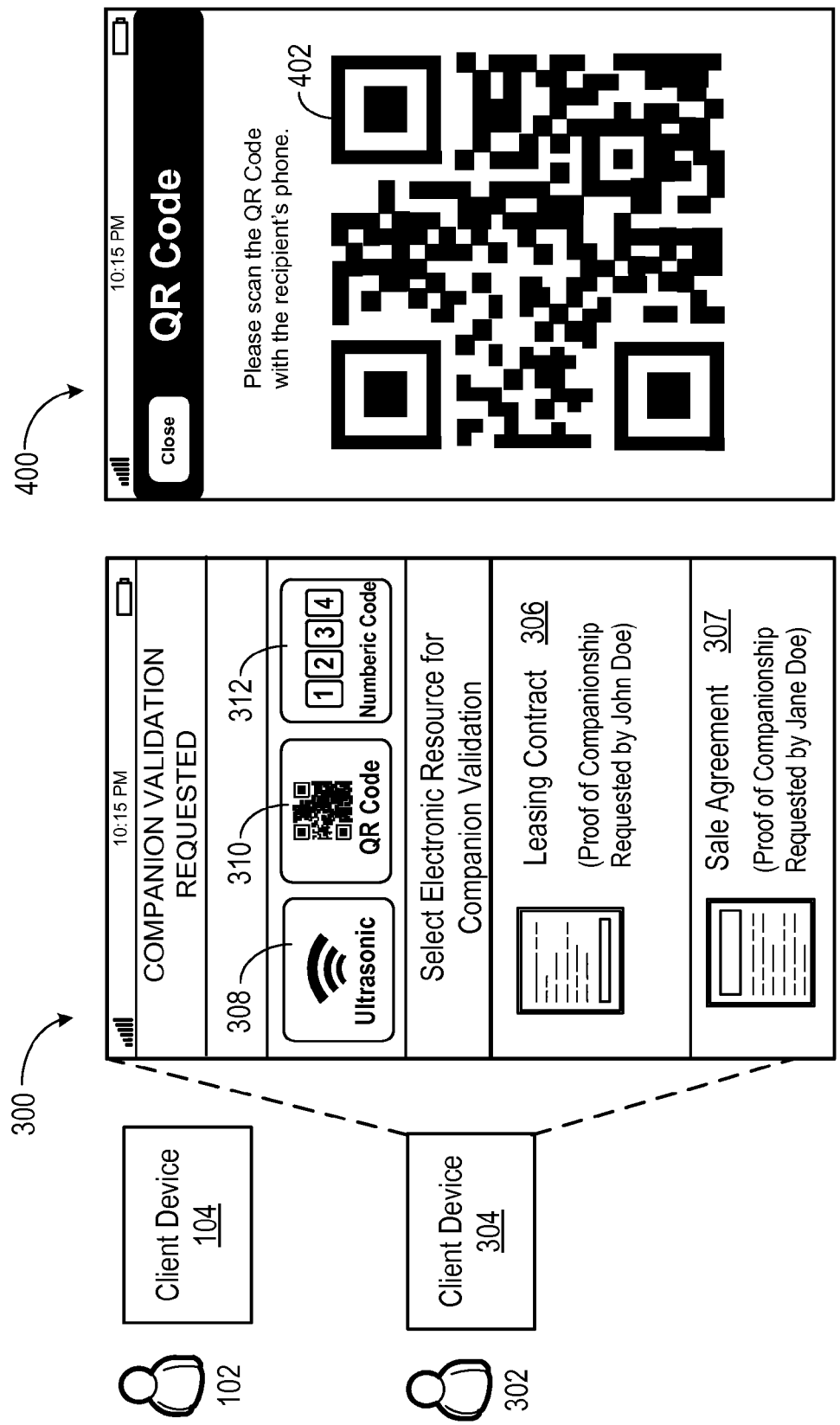

ELECTRONIC SIGNATURES

CROSS-REFERENCE TO RELATED APPLICATION

This application is a continuation (and claims the benefit of priority under 35 USC 120) of U.S. application Ser. No. 13/941,636, filed Jul. 15, 2013, now allowed, which claims priority from U.S. Provisional Application No. 61/731,795, filed Nov. 30, 2012, and titled "Electronic Signatures," the contents of each of which are incorporated by reference in their entirety.

BACKGROUND

Generally, a credential may identify a person as being associated with a particular entity and/or as being authorized to access various types of information. An electronic resource may include an item of data that is accessible from a network and/or a computing device. There are various types of electronic resources, including, e.g., HTML pages, web pages, web sites, word processing documents, portable document format (PDF) documents, images, videos, electronic files, applications, and so forth.

SUMMARY

In one aspect of the present disclosure, a method includes: storing, at a server device, an electronic resource; receiving, at the server device and from a client device associated with a first user, a request on behalf of the first user to access the electronic resource; responsive to receiving the request on behalf of the first user to access the electronic resource, enabling the client device associated with the first user to access the electronic resource; while the client device associated with the first user is accessing the electronic resource, receiving, at the server device and from the client device associated with the first user, a request to validate a representation of a credential purported to represent another user received by the client device; validating the received representation of the credential as representing a second user; and responsive to validating the received representation of the credential, enabling the first user to electronically sign the electronic resource. Examples of the disclosure can include one or more of the following features.

In some implementations, enablement of electronic signing of the electronic resource is conditioned on the representation of the credential being for a specific user; wherein validating the received representation of the credential includes determining that the second user is the specific user; and wherein enabling the first user to electronically sign the electronic resource includes enabling the first user to electronically sign the electronic resource as a consequence of having determined that the second user is the specific user.

In other implementations, enablement of electronic signing of the electronic resource is conditioned on the representation of the credential being for a specific credential type; wherein validating the received representation of the credential includes determining that the credential is of the specific credential type; and wherein enabling the first user to electronically sign the electronic resource includes enabling the first user to electronically sign the electronic resource as a consequence of having determined that the credential is of the specific credential type. In still other implementations, the method includes transmitting a request for approval from the second user to another client device associated with the second user before enabling the first user to electronically sign the electronic resource; and receiving an indication of approval by the second user from the other client device associated with the second user, wherein enabling the first user to electronically sign the electronic resource includes enabling the first user to electronically sign the electronic resource as a consequence of having received the indication of approval by the second user from the other client device associated with the second user.

In yet other implementations, enabling the first user to electronically sign the electronic resource comprises: using a private key held in escrow for the first user, by the server device, to electronically sign the electronic resource on behalf of the first user. In still other implementations, enabling the first user to electronically sign the electronic resource comprises: transmitting the electronic resource to the client device associated with the first user.

In some implementations, at least a portion of the electronic resource is in a locked state, prior to validation of the received representation of the credential, and wherein the method further comprises: following validation, updating at least the portion of the electronic resource to an unlocked state for entry of an electronic signature; and recording information identifying the second user represented by the credential as the user who unlocked at least the portion of the electronic resource.

In still another aspect of the disclosure, one or more machine-readable media are configured to store instructions that are executable by one or more processing devices to perform operations including storing an electronic resource; receiving, from a client device associated with a first user, a request on behalf of the first user to access the electronic resource; responsive to receiving the request on behalf of the first user to access the electronic resource, enabling the client device associated with the first user to access the electronic resource; while the client device associated with the first user is accessing the electronic resource, receiving, from the client device associated with the first user, a request to validate a representation of a credential purported to represent another user received by the client device; validating the received representation of the credential as representing a second user; and responsive to validating the received representation of the credential, enabling the first user to electronically sign the electronic resource. Examples of this aspect of the present disclosure can include one or more of the foregoing features.

In yet another aspect of the disclosure, an electronic system includes one or more processing devices; and one or more machine-readable media configured to store instructions that are executable by the one or more processing devices to perform operations including: storing an electronic resource; receiving, from a client device associated with a first user, a request on behalf of the first user to access the electronic resource; responsive to receiving the request on behalf of the first user to access the electronic resource, enabling the client device associated with the first user to access the electronic resource; while the client device associated with the first user is accessing the electronic resource, receiving, from the client device associated with the first user, a request to validate a representation of a credential purported to represent another user received by the client device; validating the received representation of the credential as representing a second user; and responsive to validating the received representation of the credential, enabling the first user to electronically sign the electronic resource. Examples of this aspect of the present disclosure can include one or more of the foregoing features.

In one aspect of the present disclosure, a method includes storing, at a computing device, an electronic resource, the electronic resource comprising an electronic signature field for operation in at least a first state and a second state, wherein the first state prohibits an electronic signature from being applied to the electronic signature field and the second state allows the electronic signature to be applied to the electronic signature field; receiving, at the computing device, a request on behalf of a first user to access the electronic resource; responsive to receiving the request on behalf of the first user to access the electronic resource, providing the first user with access to the electronic resource with the electronic signature field operating in the first state; while providing the first user with access to the electronic resource with the electronic signature field operating in the first state, receiving, at the computing device, a representation of a credential; validating the received representation of the credential as representing a second user; and responsive to validating the received representation of the credential, transitioning the electronic signature field of the electronic resource from the first state to the second state.

Examples of the disclosure can include one or more of the following features. In some implementations, the method includes applying an electronic signature of the first user to the electronic signature field of the electronic resource, after transitioning the electronic signature field of the electronic resource from the first state to the second state. In other implementations, transitioning the electronic signature field from the first state to the second state includes transitioning the electronic signature field from the first state to the second state for a limited period of time following transition to the second state before transitioning the electronic signature field from the second state back to the first state. In still other implementations, the computing device comprises a mobile device used by the first user, and wherein validating the received representation of the credential comprises: validating, at the mobile device, the received representation of the credential as representing the second user. In yet other implementations, the computing device comprises a server device, and wherein validating the received representation of the credential comprises: validating, at the server device, the received representation of the credential as representing the second user.

In other implementations, transitioning the electronic signature field of the electronic resource from the first state to the second state is conditioned on the representation of the credential being for a specific user; and wherein validating the received representation of the credential includes determining that the second user is the specific user; and wherein transitioning the electronic signature field of the electronic resource from the first state to the second state includes transitioning the electronic signature field of the electronic resource from the first state to the second state as a consequence of having determined that the second user is the specific user.

In still other implementations, transitioning the electronic signature field of the electronic resource from the first state to the second state is conditioned on the representation of the credential being for a specific credential type; wherein validating the received representation of the credential includes determining that the credential is of the specific credential type; and wherein transitioning the electronic signature field of the electronic resource from the first state to the second state includes transitioning the electronic signature field of the electronic resource from the first state to the second state as a consequence of having determined that the credential is of the specific credential type. In still other implementations, transitioning the electronic signature field of the electronic resource from the first state to the second state responsive to validating the received representation of the credential includes recording information identifying the second user associated with the validated representation of the credential.

In still another aspect of the disclosure, one or more machine-readable media are configured to store instructions that are executable by one or more processing devices to perform operations including: storing an electronic resource, the electronic resource comprising an electronic signature field for operation in at least a first state and a second state, wherein the first state prohibits an electronic signature from being applied to the electronic signature field and the second state allows the electronic signature to be applied to the electronic signature field; receiving, at the computing device, a request on behalf of a first user to access the electronic resource; responsive to receiving the request on behalf of the first user to access the electronic resource, providing the first user with access to the electronic resource with the electronic signature field operating in the first state; while providing the first user with access to the electronic resource with the electronic signature field operating in the first state, receiving, at the computing device, a representation of a credential; validating the received representation of the credential as representing a second user; and responsive to validating the received representation of the credential, transitioning the electronic signature field of the electronic resource from the first state to the second state. Examples of this aspect of the present disclosure can include one or more of the foregoing features.

In yet another aspect of the disclosure, an electronic system includes one or more processing devices; and one or more machine-readable media configured to store instructions that are executable by the one or more processing devices to perform operations including: storing an electronic resource, the electronic resource comprising an electronic signature field for operation in at least a first state and a second state, wherein the first state prohibits an electronic signature from being applied to the electronic signature field and the second state allows the electronic signature to be applied to the electronic signature field; receiving, at the computing device, a request on behalf of a first user to access the electronic resource; responsive to receiving the request on behalf of the first user to access the electronic resource, providing the first user with access to the electronic resource with the electronic signature field operating in the first state; while providing the first user with access to the electronic resource with the electronic signature field operating in the first state, receiving, at the computing device, a representation of a credential; validating the received representation of the credential as representing a second user; and responsive to validating the received representation of the credential, transitioning the electronic signature field of the electronic resource from the first state to the second state. Examples of this aspect of the present disclosure can include one or more of the foregoing features.

All or part of the foregoing can be implemented as a computer program product including instructions that are stored on one or more non-transitory machine-readable storage media, and that are executable on one or more processing devices. All or part of the foregoing can be implemented as an apparatus, method, or electronic system that can include one or more processing devices and memory to store executable instructions to implement the stated functions.

The details of one or more examples are set forth in the accompanying drawings and the description below. Other features will be apparent from the description and drawings, and from the claims.

BRIEF DESCRIPTION OF THE DRAWINGS

FIGS. 1-4, 5A and 5B illustrate examples of graphical user interfaces for an example of an application that enables the unlocking of electronic resources based on satisfaction of conditions.

DETAILED DESCRIPTION

Figure 1:
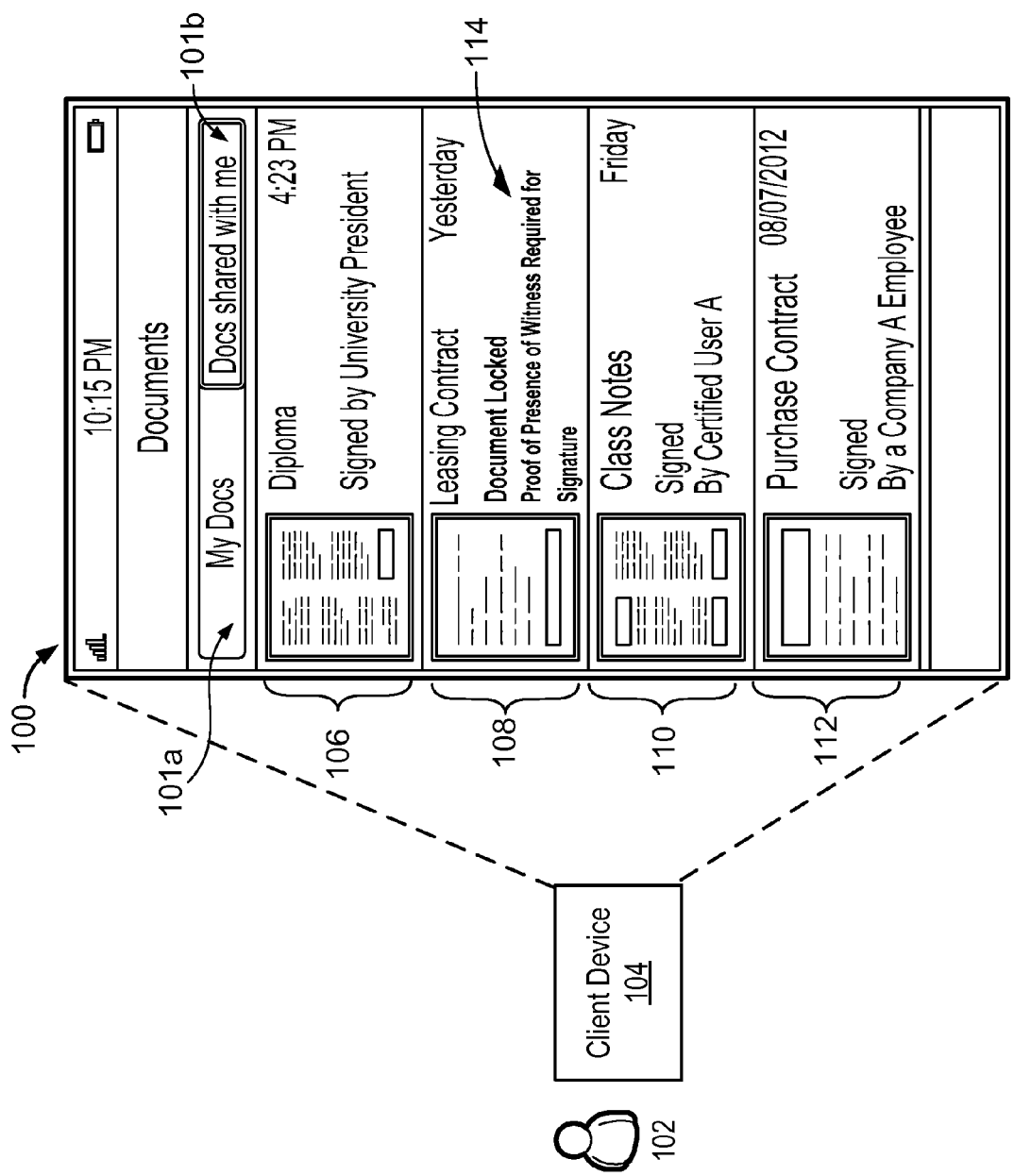

A system consistent with this disclosure enables enforcement of a condition that an electronic resource can be electronically signed only if the signer is in the presence of a companion. Generally, a signer includes a user of the system who is authorized to electronically sign an electronic resource. Generally, a companion includes a user of the system who is in the presence of another user of the system. For example, a companion may include a specific user of the system and/or a user possessing a particular credential type (e.g., a notary republic credential). In an example, enforcement of the condition is performed client side, e.g., by a client device (e.g., a mobile device) of the signer. In this example, the client device maintains the electronic resource to be signed. To prove that the signer is in the presence of the companion, the companion provides a representation of a credential (e.g., a mobile device-based representation of a credential) that identifies the companion to the signer's client device. Generally, a representation of a credential includes an electronic presentation of a credential. Upon receipt of the representation of the credential, the signer's client device attempts to validate the companion's credential. Responsive to a successful validation of the companion's credential, the signer is enabled to electronically sign the electronic resource.

In one example, an electronic resource includes a signature field. Generally, a signature field includes a portion of an electronic resource that is designated for entry of an electronic signature. In this example, the electronic resource (or at least the signature field of the electronic resource) is locked prior to validation of the companion's credential. When the electronic resource (or the signature field of the electronic resource) is locked, the signer is prevented from electronically signing the electronic resource. Generally, the locking of an electronic resource includes the protecting of the electronic resource from modification and/or deletion. Upon successful validation of the companion's credential, the client device unlocks the electronic resource (or the signature field of the electronic resource), e.g., to enable the signer to electronically sign the signature field of the electronic resource. Generally, the unlocking of an electronic resource includes making the electronic resource available for modification and/or deletion.

In still another example, the system includes a server that maintains the electronic resource prior to validation of the companion's credential. In this example, the electronic resource is locked or otherwise unavailable for signing by the signer. Upon successful validation of the companion's credential, the server unlocks the electronic resource and/or transmits the electronic resource to the signer's client device for entry of an electronic signature. In an alternative example, upon successful validation of the companion's credential, the server enables the signer to instruct the server to sign the electronic resource on the signer's behalf. In this example, the server stores a private key of the signer (e.g., in escrow) and uses the private key to sign the electronic resource on the signer's behalf.

Referring to FIG. 1, client device 104 displays graphical user interface 100. In this example, client device 104 is used by user 102. In the example of FIG. 1, client device 104 implements an application (not shown) for displaying electronic resources that are available to user 102 within the application. In this example, graphical user interface 100 is one of the graphical user interfaces rendered by the application.

In the example of FIG. 1, some of the electronic resources may be owned by user 102, while some other electronic resources may be owned by other entities, but shared with user 102. Based on a selection of one of control 101a or control 101b, graphical user interface 100 can switch between views that show the list of electronic resources owned by user 102 and the list of electronic resources shared with user 102, respectively. In the example of FIG. 1, control 101b is selected, such that graphical user interface 100 displays indicators 106, 108, 110, 112 of electronic resources that are shared with user 102.

In this example, an electronic resource (e.g., electronic resource 206 in FIG. 2) is associated with indicator 108. This electronic resource is associated with a condition that the electronic resource can be electronically signed by user 102 when user 102 is in the presence of a companion (not shown). In this example, the electronic resource associated with indicator 108 is locked, e.g., as user 102 is not in the presence of a companion. Indicator 108 displays notification message 114 notifying user 102 that the electronic resource associated with indicator 108 is locked and that a presence of a companion is required to unlock the electronic resource.

In this example of FIG. 1, user 102 is prevented from electronically signing the electronic resource associated with indicator 108, until after the presence of a companion has been validated. The presence of a companion may be validated by one or more of client device 104, an application running on client device 104, and a server (not shown) that is external to client device 104. In the example of FIG. 1, user 102 may select the portion of graphical user interface 100 associated with indicator 108, e.g., to cause client device 104 to display the electronic resource represented by indicator 208.

Figure 2:
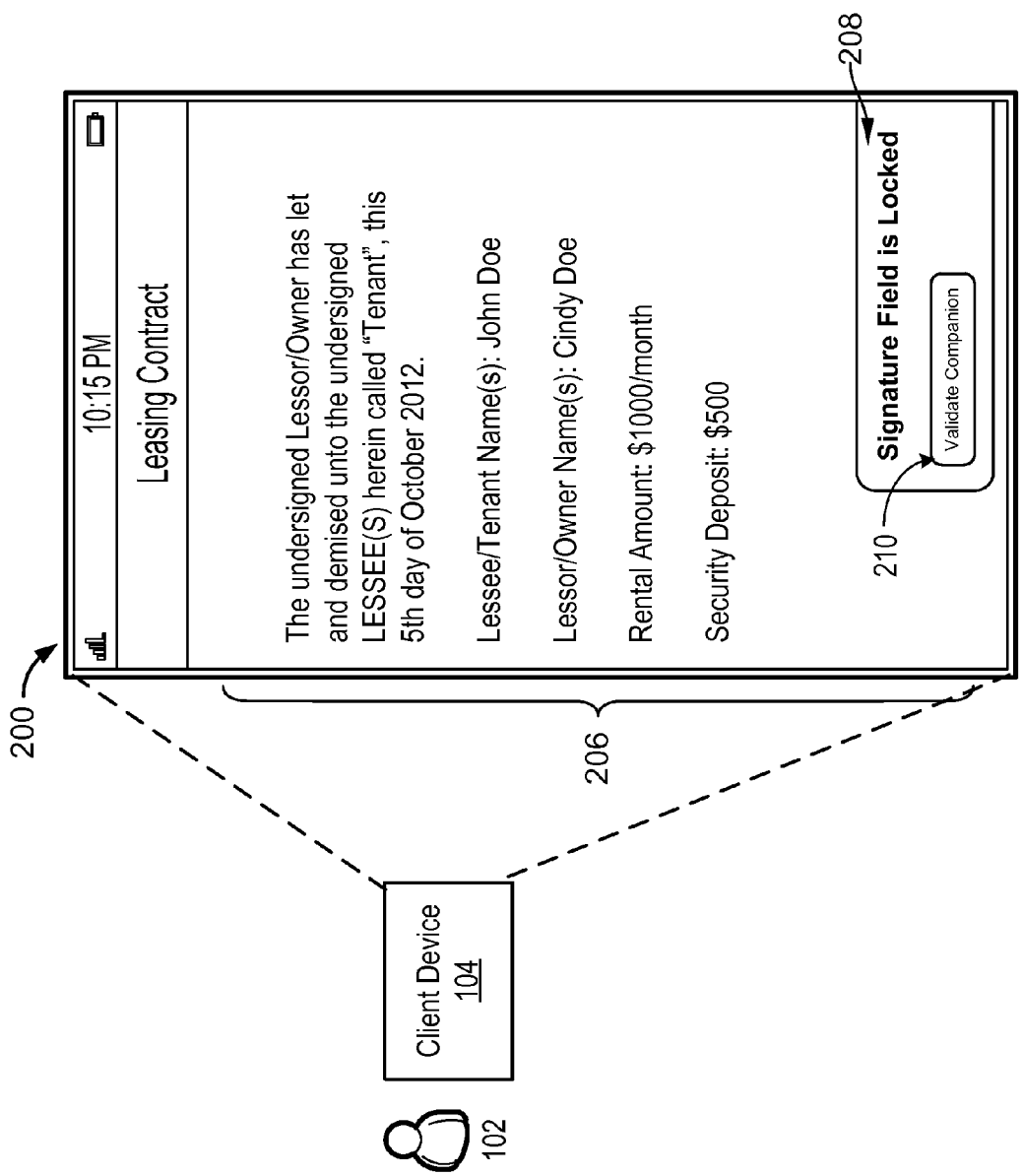

Referring to FIG. 2, graphical user interface 200 is displayed on client device 104, e.g., following selection of the portion of graphical user interface 100 associated with indicator 108 (FIG. 1). Graphical user interface 200 displays a visual representation of electronic resource 206. In this example, electronic resource 206 is the electronic resource represented by indicator 108 (FIG. 1). Electronic resource 206 includes signature field 208. In this example, user 102 desires to electronically sign electronic resource 206. Hereinafter, user 102 may be referred to as signer 102, for purposes of convenience, and without limitation.

In the example of FIG. 2, electronic resource 206 is associated with a condition that electronic resource 206 can be electronically signed if signer 102 is in the presence of a companion (not shown). In this example, signature field 208 is locked, e.g., as signer 102 is not in the presence of a companion. In this example, signature field 208 includes control 210 for enabling signer 102 to receive a credential from a companion, e.g., in order to unlock electronic resource

206. Following selection of control 210, client device 104 may start listening for an ultrasonic audio signal representation of a credential. In another example, following selection of control 210, client device 104 may instruct signer 102 to user a scanner to scan into client device 104 an optical machine-readable representation of a credential of a companion. In yet another example, following selection of control 210, client device 104 may instruct signer 102 to enter an alphanumeric code representation of a credential of a companion. In still another example, selection of control 210 causes client device 104 to send to a server (not shown) a message requesting that the server notify one or more companions of signer's 102 need to validate companionship, e.g., in order to unlock electronic resource 206.

Referring to FIG. 3, signer 102 is in the presence of companion 302, e.g., based on companion 302 moving into a location in which signer 102 is present. In the example of FIG. 3, companion 302 uses client device 304. In this example, signer 102 verbally communicates to companion 302 that signer 102 needs a representation of a credential for companion 302, e.g., in order to electronically sign electronic resource 206. In response, companion 302 uses client device 304 to request, e.g., from client device 304 and/or a server, a representation of a credential for companion 302. In this example, client device 304 and/or the server may prompt companion 302 to select a type of representation for the credential.

In an example, client device 304 and/or the server manages multiple, different credentials for companion 302. For example, client device 304 and/or the server may manage a notary republic credential for the companion, an employee credential for the companion demonstrating employment by a particular company, and so forth. In this example, companion 302 selects a particular type of credential to use to unlock electronic resource 206 (FIG. 2).

For example, electronic resource 206 may be associated with a condition that electronic resource 206 can only be electronically signed if signer 102 is in the presence of a companion that has a particular type of credential. In this example, signer 102 may verbally specify to companion 302 that signer 102 needs a representation of a particular type of credential for companion 302, e.g., in order to electronically sign electronic resource 206. In response, companion 302 selects a credential of the specified type to use to unlock electronic resource 206.

In the example of FIG. 3, client device 304 displays graphical user interface 300 for companion 302 to select a type of representation for the credential. In the example of FIG. 3, graphical user interface 300 also displays notification messages 306, 307. Notification message 306 notifies companion 302 that signer 102 is requesting validation of the presence of companion 302, e.g., to enable signer 102 to access electronic resource 206 that can be unlocked when signer 102 is in the presence of companion 302. Notification message 307 notifies companion 302 that another signer is also requesting validation of the presence of companion 302, e.g., to enable the other signer to access an electronic resource (e.g., a sale agreement document) that can be unlocked when the other signer is in the presence of companion 302.

In an example, notification messages 306, 307 are generated by a server that is in communication with client device 304. For example, client device 104 that is used by signer 102 (FIG. 2) may send, to the server, a request to generate notification message 306. In this example, upon selection of control 210, client device 104 may generate the request. In response to receipt of the request, the server may determine that companion 302 is qualified to unlock electronic resource 206 for signing, generate notification message 306, and transmit notification message 306 to client device 304 associated with companion 302.

In another example, companion 302 may be the only companion who may unlock electronic resource 206 for signing. In this example, client device 304 displays notification message 306, e.g., when signer 102 opens electronic resource 206. For example, when signer 102 opens electronic resource 206, client device 104 or the server may send to client device 304 information specifying that signer 102 has opened electronic resource 206. In response, client device 304 may generate and display notification message 306.

As previously described, the presence of companion 302 may be validated based on the presentation of a representation of a credential of companion 302 to client device 104. There are various types of representations for credentials. For example, a credential may be represented as a numeric or alphanumeric representation, an ultrasonic audio signal representation, an animated graphical representation, a parametrically-generated graphical representation, an audio representation of a phrase and an optical machine-readable representation (e.g., a quick response (QR) code), each of which are described in further detail below.

In the example of FIG. 3, graphical user interface 300 displays controls 308, 310, 312. Through selection of controls 308, 310, 312, companion 302 can select a type a representation for the credential of companion 302. For example, through selection of control 308, companion 302 specifies that the credential is represented as an ultrasonic audio signal. Through selection of control 310, companion 302 specifies that the credential is represented as a QR code. Through selection of control 312, companion 302 specifies that the credential is represented as a numeric value. In this example, companion 302 selects control 310. In response, client device 304 receives (e.g., from a server) QR code 402, as shown in graphical user interface 400 in FIG. 4.

In another example, client device 304 may receive information about the credential from the server. For example, the information about the credential may include a credential identifier (e.g., a number or character string that uniquely identifies a credential), information specifying a type of the credential, and so forth. Using the received information, client device 304 may generate the representation of the credential, including, e.g., an ultrasonic audio signal representation, an optical machine-readable representation, and a numeric or alphanumeric value representation. Referring to FIGS. 2-4, companion 302 causes QR code 402 to be presented and/or transmitted to client device 104 of signer 102. For example, companion 302 may allow signer 102 to scan (e.g., photograph) QR code 402 into client device 104, e.g., via an optical scanner (e.g., a camera). In this example, client device 104 may transmit QR code 402 to a server, e.g., to validate the credential of companion 302. Upon successful validation of the credential of companion 302, the server may unlock electronic resource 206.

Responsive to a successful validation of the credential of companion 302, signer 102 may be enabled to electronically sign electronic resource 206. In an example, signer 102 is enabled to electronically sign electronic resource 206, e.g., by the server transmitting electronic resource 206 to client device 104. In another example where electronic resource 206 is stored locally on client device 104, signer 102 is enabled to electronically sign electronic resource 206, e.g., by client device 104 unlocking electronic resource 206 and/or by unlocking signature field 208 of electronic resource 206.

Figure 5A:
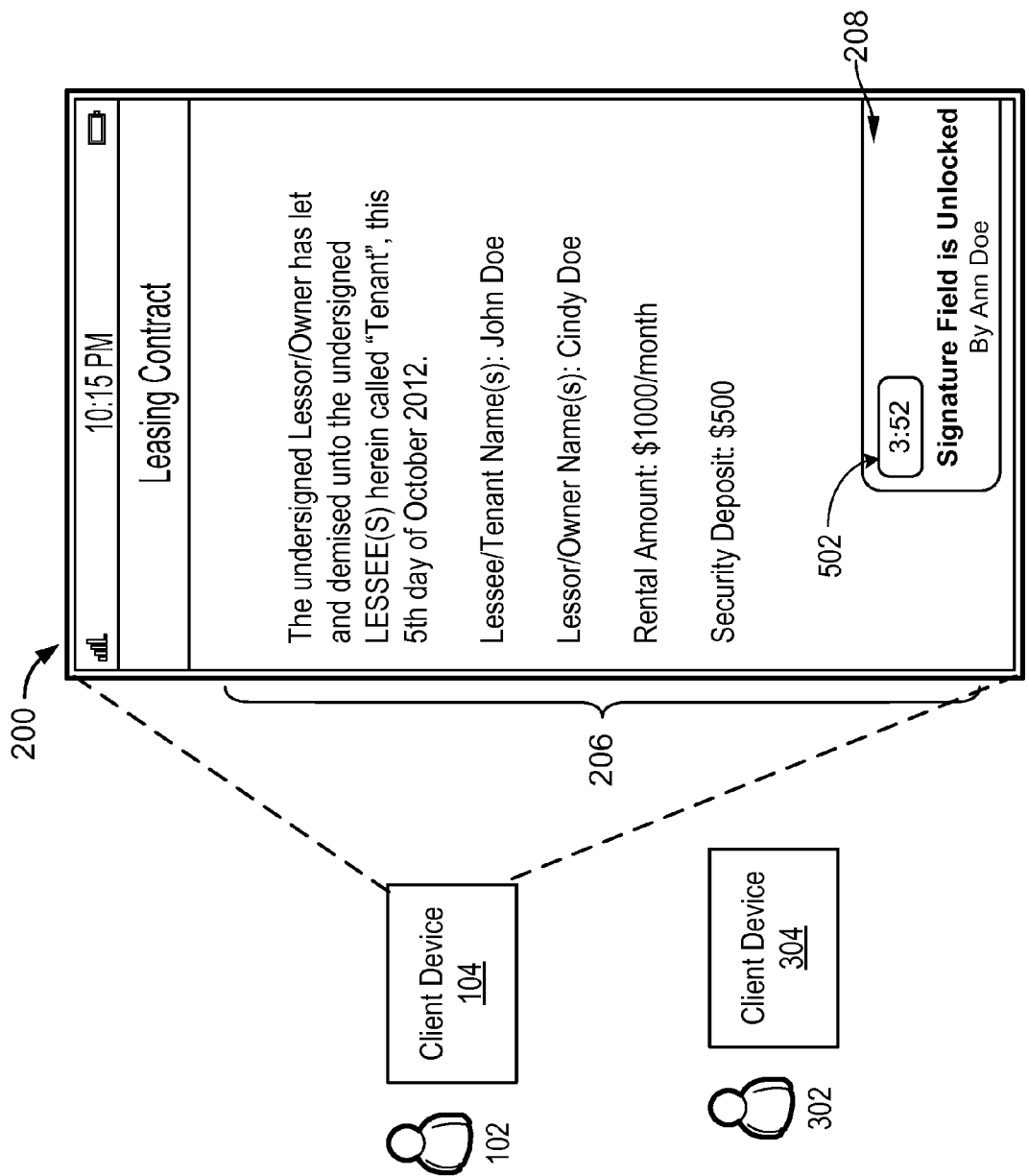

Responsive to a successful validation of the credential of companion 302, signature field 208 is unlocked. As shown in FIG. 5A, signature field 208 in graphical user interface 200 is updated to display a message indicating that the signature field has been successfully unlocked, e.g., by validating that signer 102 is in the presence of companion 302. The message displayed in signature field 208 also includes an indication of a name (e.g., Ann Doe) of companion 302 who enabled electronic resource 206 to be unlocked.

In this example of FIG. 5A, signature field 208 remains unlocked for a temporary period of time, e.g., to decrease a likelihood of a malicious user electronically signing electronic resource 206, relative to the likelihood of a malicious user electronically signing electronic resource 206 should signature field 208 remain unlocked indefinitely. In the example of FIG. 5A, signature field 208 is updated to include portion 502, e.g., for display of a clock indicative of an amount of time that remains until signature field 208 is locked.

Figure 5B:
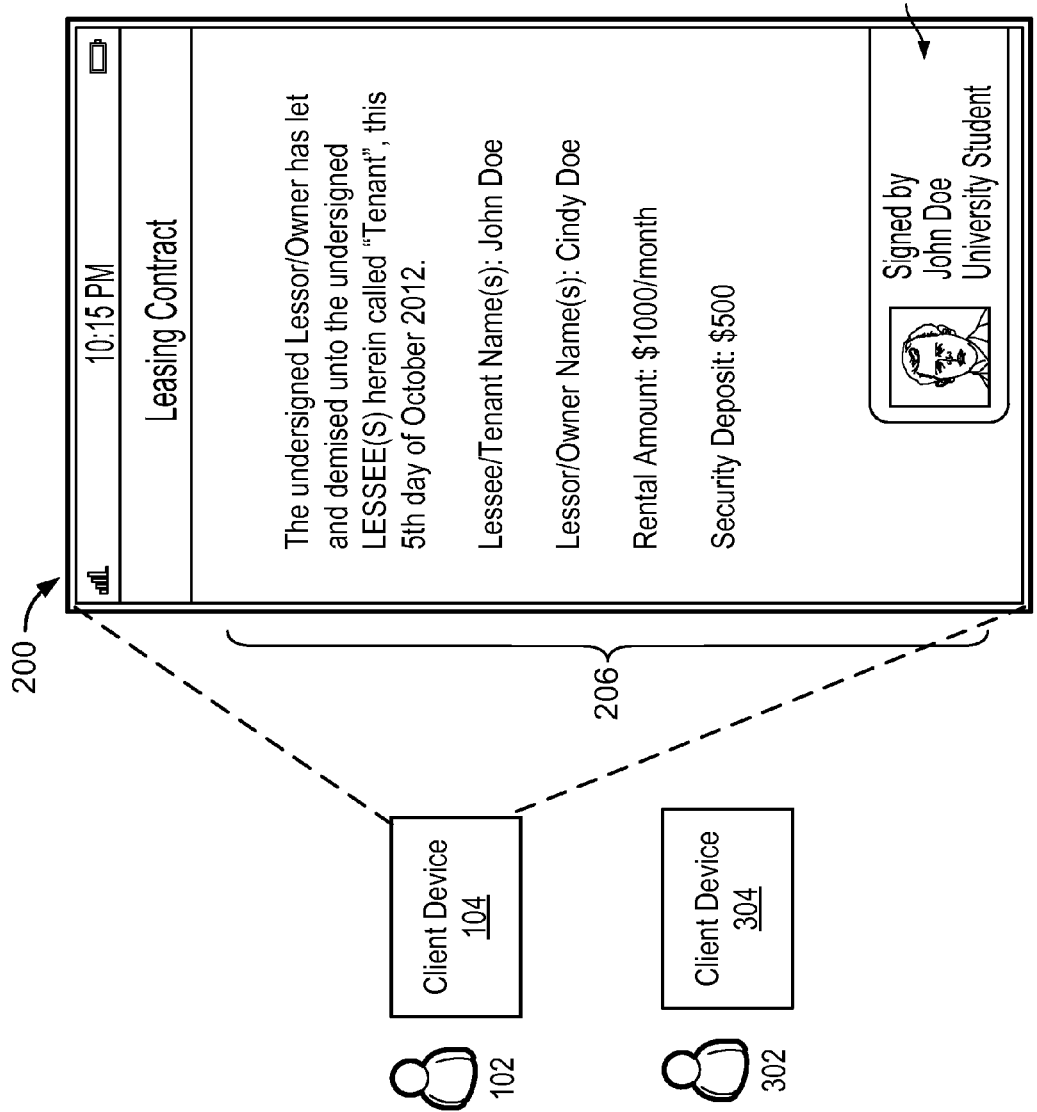

Following unlocking of signature field 208, signer 102 is enabled to electronically sign electronic resource 206. In the example of FIG. 5B, signer 102 inputs an electronic signature into signature field 208. As shown in FIG. 5B, signature field 208 in graphical user interface 200 is updated to display the contents of the electronic signature. In some implementations, the electronic signature may be based on a public key infrastructure (PKI), for example, and/or on the Electronic Signature Algorithm (DSA).

Additionally or alternatively, the electronic signature may be based on an electronic credential of signer 102 accessible via client device 104. For example, signer 102 may be a university student for whom an electronic university student credential is available via client device 104 and who uses the electronic university student credential to electronically sign electronic resource 206. In such implementations, information represented by the electronic university student credential may be included in the electronic signature applied to electronic resource 206. For instance, the name of signer 102 and the name of signer 102's university may be included in the electronic signature applied to electronic resource 206 by virtue of signer 102 using signer 102's university student credential to electronically sign electronic resource 206. In still another example, signer 102 may apply an electronic signature to electronic resource 206 by entering a series of keystrokes on client device 104 (e.g., "/John Doe/") and/or by selecting an image file representing an electronic signature of signer 102 to be embedded within or otherwise associated with electronic resource 102.

In the example of FIG. 5B, signer 102 is named John Doe and is a university student, in this example. In this example, after signer 102 has entered an electronic signature into signature field 208, the contents of signature field 208 display the name of signer 102 and information specifying that signer 102 is a university student.

Figure 6:
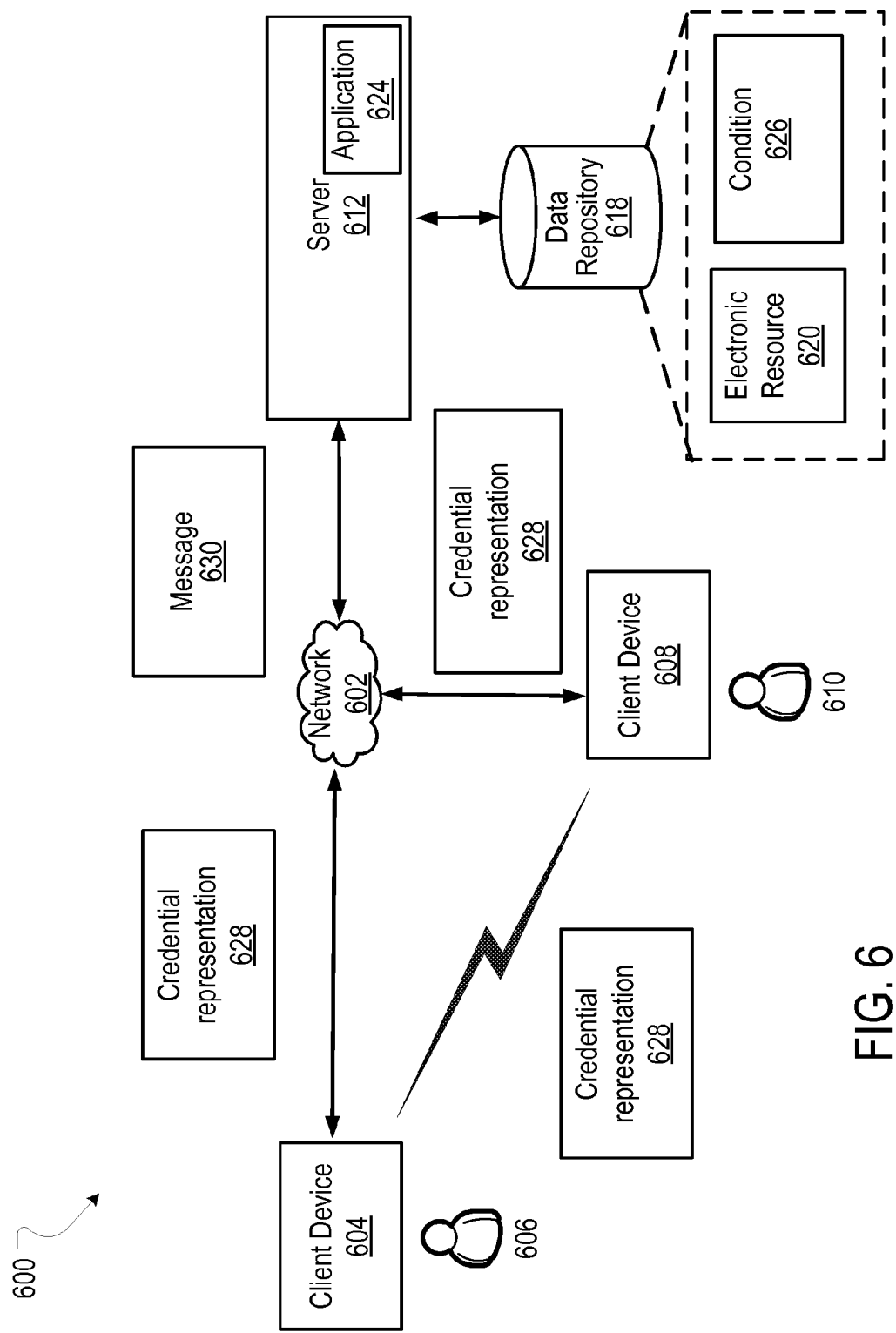
FIG. 6 is a block diagram of an example of a network environment that enables the unlocking of electronic resources based on satisfaction of conditions.

FIG. 6 is a block diagram of an example of a network environment 600 that enables the unlocking of electronic resources based on satisfaction of conditions. Network environment 600 includes network 602, client devices 604, 608, server 612, and data repository 618. Network environment 600 may include many thousands of data repositories, client devices, and servers, which are not shown.

In an example, client device 604 is associated with user 606. In this example, user 606 desires to electronically sign electronic resource 620. Hereinafter, user 606 may be referred to as signer 606 and client device 604 may be referred to as signer device 604, for purposes of convenience, and without limitation. Client device 608 is associated with user 610. In this example, user 610 is a companion of signer 606. Hereinafter, user 610 may be referred to as companion 610 and client device 608 may be referred to as companion device 608, for purposes of convenience, and without limitation.

In the example of FIG. 6, server 612 hosts one or more applications, including, e.g., application 624. Generally, an application includes a computer program with a graphical user interface. In this example, application 624 is an identity management application that enables enforcement of a condition that an electronic resource can be electronically signed if the signer is in the presence of a companion. In an example, client devices 604, 608 may download a client application (not shown) for interacting with application 624 and/or for interacting with server 612. In another example, client devices 604, 608 may use a web browser to access application 624 from server 612, e.g., rather than downloading a client application for interacting with application 624 onto client devices 604, 608. In an example, application 624 and/or a client application for interacting with application 624 may be configured to render one or more of graphical user interfaces 100, 200, 300, 400, as shown in FIGS. 1-5.

In an example, server 612 manages representations for credentials associated with users and groups of users, and permits one or more users to validate the credentials for users by inspecting the representations.

In an example, a credential may be evidence of authority, status, rights, or entitlement to privileges that can be, for example, a badge or identifier for membership in a group (e.g., an employee of a company, a graduate of a school, a professional certification), forms of personal identification (e.g., drivers' licenses, identity cards, passports, etc.), and so forth.

As previously described, credentials can be represented by parametrically-generated graphical representations, animated graphical representations, phrases, numeric representations, ultrasonic audio signal representations and/or optical machine-readable representations. Combinations of one or more of these representations can also be used. In certain aspects, credentials also may be hierarchical. For example, a first credential may generally identify an individual as an employee of Company X, while a second credential identifies the individual more specifically as an executive of Company X, and a third credential identifies the individual as the Chief Executive Officer of Company X.

In operation, server 612 manages and stores one or more credentials, associates users with appropriate credentials, and provides representations of the credentials to users' client devices and/or to processing systems (e.g., operated by credential authorities) for validation. In this example of FIG. 6, credentials may be stored in data repository 618.

In an example, server 612 generates a credential based on input provided by a credential grantor (not shown). Generally, a credential grantor includes an entity that grants a credential to a user. For example, a credential grantor may be a company, a school, a professional certification organization, a government agency, and so forth. The credentials may include a variety of information, including, e.g., a description of an entity granting the credential (e.g., a school, a professional certification organization, a government agency, and so forth), a credential identifier, and so forth. In addition to creation of credentials by credential grantors, credentials could be created at the request of users through a web-based or other interface, or through any other suitable mechanism such as sending email or short message service (SMS) to credential grantors.

Server 612 generates credentials (e.g., identified by credential identifiers), e.g., based on information received from credential grantors. In data repository 618, server 612 generates associations between credential identifiers and user identifiers for various users. Generally, a user identifier includes information that uniquely identifies a user. Based on the associations, server 612 may use a user identifier in identifying a credential identifier for a particular user.

In an example, companion 610 may request a new user account from server 612, e.g., using an application executing on companion device 608. In response to the request, server 612 generates, in data repository 618, a database entry representing a user account for companion 610. A credential grantor may generate, in data repository 618, a database entry in another table for a group of individuals that are granted credentials as employees of Company X. In this example, the credential grantor could grant companion 610 credentials of being an employee of Company X, e.g., by linking the database entry for the user account for companion 610 to the database entry in the other table for the group of individuals that are granted credentials as employees of Company X.

Furthermore, server 612 also may notify the users that they have been associated with credentials, for example, by pushing notifications to the respective users' client devices. Such notifications may include the credential identifier for the credential and/or a representation of the credential itself.

In an example, server 612 generates credential representation 628 for companion 610. Generally, credential representation 628 includes a representation of a credential for companion 610. Server 612 implements various techniques in using credential representation 628 to validate a credential of companion 610. In an example, when server 612 generates a representation of a credential (e.g., credential representation 628), server 612 stores, in data repository 618, a copy of the representation of the credential. In this example, when server 612 receives, from signer device 604, credential representation 628, server 612 queries data repository 618 for valid representations of credentials that match credential representation 628. Generally, a valid representation includes a representation for a credential of a companion. When server 612 identifies a match between one of the valid representations and credential representation 628, server 612 validates the credential of companion 610, and thereby confirms that companion 610 in the presence of signer 606.

In another example, upon receipt of credential representation 628 for validation, server 612 is configured to generate, in real-time, a representation of a credential for companion 610. In this example, server 612 may use a credential identifier for companion 610, a type of credential represented by credential representation 628, a type of representation for credential representation 628, and other seed information in generating a representation of a credential for companion 610. In this example, server 612 validates a credential for companion 610, e.g., when server 612 identifies a match between the generated representation and credential representation 628.

Server 612 may generate numerous types of representations of a credential, including, e.g., a numeric representation, an ultrasonic audio signal representation, an animated graphical representation, a parametrically-generated graphical representation, a phrase and an optical machine-readable representation, each of which is described in further detail below.

In an example, server 612 generates a numeric representation of a credential. Generally, a numeric representation includes a sequence of numbers (e.g., 4 to 24-digit integers) that is associated with a credential and a user. In some instances, a given numeric representation will only be valid for a certain time period. In the example of FIG. 6, server 612 associates a numeric representation with a credential for companion 610 and distributes the numeric representation to companion device 608. In this example, companion 610 presents a numeric value (e.g., a stored numeric representation from the server 612) to signer 606, for example, by making an utterance including the numeric value or displaying the numeric value rendered on companion device 608. In response, signer 606 may enter the numeric value into signer device 604, and signer device 604 may transmit the numeric value to server 612. In response, server 612 validates that the received numeric value matches a valid numeric representation for a credential (e.g., a numeric representation for the credential that currently is associated with a user to whom the credential has been granted at the point in time signer device 604 communicates the numeric value to server 612).

In an example, server 612 may implement various techniques in generating a numeric representation of a credential. In one example, server 612 may use a random number generator or pseudo-random number generator provided by a function or library routines that are accessible to server 612. A pseudo-random number generator may use a clock at server 612 as a seed, which may provide suitable randomness for some applications.

In some examples, the numeric representations that server 612 generates for credentials may be temporary and expire at a predetermined time (e.g., after a predetermined time period). Server 612 may choose a time period for the numeric representations, such as, for example, one minute, five minutes, or ten minutes. The expiration time for the corresponding numeric representation can then be associated with the numeric representation. For example, the expiration time may be an entry in data repository 618 that is included with the entry for the numeric representation. In some examples, the time period may vary depending on a length of the numeric representation. For example, a 4-digit numeric representation may expire after a short time, such as five minutes or ten minutes, whereas a longer eight-digit numeric representation may expire after a longer time, such as one hour or one day. In some examples, a longer numeric representation may be valid for an indefinite (e.g., unlimited) time period. This may be advantageous, for example, in cases where a user's client device does not have access to server 612 via network 602.

In still another example, server 612 generates an alphanumeric representation of a credential. Generally, an alphanumeric representation includes a sequence of one or more of numbers, letters, and/or non-numeric symbols. In an example, an alphanumeric representation includes one or more of a string of letters, a string of numbers, and a string of letters and non-numeric symbols, or any combination thereof.

A numeric and/or an alphanumeric representation can be transmitted from companion device 608 to signer device 604 in several ways. For example, companion device 608 could output an audio signal from a speaker corresponding to the contents (e.g., symbols, letters, and/or numeric values) of the numeric and/or the alphanumeric representation that would be received by signer device 604. This audio signal could be a human perceptible audible signal (e.g., a signal with frequency ranging from 20 Hz to 20 kHz), or it could be an ultrasonic signal (e.g., a signal with frequency that exceeds 20 kHz) that is detectable by a microphone on signer device 604. As another example, companion device 608 may transmit the numeric and/or the alphanumeric representation to signer device 604 using electronic radio-frequency communications, e.g., near-field communications (NFC) or Bluetooth. In still another example, companion 610 could speak or show the contents of the numeric and/or the alphanumeric representation to signer 606, and signer 606 can enter the numeric and/or alphanumeric representation into signer device 604.

In another example, server 612 may generate optical machine-readable representations for credentials. An optical machine-readable representation may be an arrangement of graphical elements that encode alphanumeric data, where the elements are arranged so that the data can be read by an optical scanner. For example, an optical machine-readable representation may be a bar code or a QR code.

In the example of FIG. 6, companion device 608 may receive optical machine-readable representations for credentials from server 612, and/or may generate optical machine-readable representations for credentials given credential identifiers, user identifiers, and/or other values. In this example, companion device 608 outputs optical machine-readable representations for credentials to the display of companion device 608. In response, signer device 604 can scan the optical machine-readable representation from the display of companion device 608. In this example, signer device 604 transmits information indicative of the scanned optical machine-readable representation to server 612. In this example, the transmitted information includes information decoded from the optical machine-readable representation of the credential (e.g., a credential identifier and/or a user identifier). In response, server 612 validates companion 610, e.g., by confirming that the decoded information is associated with a credential for companion 610.

In this example, server 612 implements numerous techniques in generating optical machine-readable representations. In an example, server 612 generates a set of alphanumeric characters from a user identifier and a credential identifier. Server 612 also maps the user identifier and credential identifier to the set of characters, e.g., using various techniques. For example, the credential identifier and user identifier could be concatenated, manipulated using mathematical functions, encrypted using a cryptographic algorithm such as AES, hashed using a hash function such as MD5, SHA-1 or SHA-2, subsampled to select a predetermined subset or subsets, or any combination of these techniques to generate a suitable set of characters.

Once the set of alphanumeric characters has been generated, server 612 encodes the set of alphanumeric characters to generate an optical-machine readable representation for the credential, e.g., using various techniques. For example, server 612 may call a function or library routine that encodes QR codes in accordance with the QR code International Organization for Standardization (ISO) standard, ISO/IEC 18004: 2006 RSS, Information technology—Automatic identification and data capture techniques—QR Code 2005 bar code symbology specification. In another example, companion device 608 may generate the optical machine-readable representation. In this example, server 612 transmits the set of alphanumeric characters to companion device 608 for use in generating the optical machine-readable representation, e.g., as described above. Companion device 608 can store the optical machine-readable representation in a suitable memory.

In another example, rather than server 612 and/or companion device 608 encoding the generated set of alphanumeric characters into an optical-machine readable representation, companion device 608 may transmit, to signer device 604, the generated set of alphanumeric characters in several ways. For example, companion device 608 could output an audio signal from a speaker corresponding to the contents (e.g., the symbols, letters, and/or numeric values) of the generated set of alphanumeric characters that would be received by signer device 604. This audio signal could be a human perceptible audible signal (e.g., a signal with frequency ranging from 20 Hz to 20 kHz), or it could be an ultrasonic signal (e.g., a signal with frequency that exceeds 20 kHz) that is detectable by a microphone on signer device 604. As another example, companion device 608 may transmit the generated set of alphanumeric characters to signer device 604 using electronic radio-frequency communications, e.g., NFC or Bluetooth.

In still another example, server 612 generates parametrically-generated graphical representations for credentials. Generally, a parametrically-generated graphical representation includes a visual display that is generated using one or more parameters as inputs to one or more mathematical equations, such as a three-dimensional rendering of an object or an image of a fractal. In this example, the parameters can be generated from seed values such as a credential identifier and a time.

Server 612 may generate in real-time a parametrically-generated graphical representation of a credential of companion 610, e.g., to compare the generated representation to credential representation 628 in validating a credential of companion 610. In this example, credential representation 628 may include information specifying a time at which credential representation 628 was generated and/or a credential identifier for companion 610, e.g., to enable server 612 to use the specified time as a seed value and/or to use the credential identifier as a seed value.

In some examples, the parametrically-generated graphical representation for the credential can be a three-dimensional rendering of an object. The object can be, for example, a simple polyhedron, such as a cube, tetrahedron, or icosahedron, or a more complicated object such as a helix, trefoil knot, Lissajous knot, torus, torus knot, or hyperbolic knot. Various aspects of the three-dimensional rendering can be specified using a variety of parameters.

Parameters may specify the shape of the object. Parameters also may specify, for example, the color of the object, the texture applied to the object, the reflection image of an image applied to the object, the background over which the object is displayed, and/or a light source position for the object. For example, seed values (e.g., time and/or credential identifiers) could be input into an equation that generates an output that may be used as an index into a collection of different colors, textures, reflection images, and/or backgrounds from which the color, texture, reflection image, and/or background may be selected. Furthermore, seed values (e.g., time and/or credential identifiers) could be input into an equation that generates an output that may be used as an index into a collection of objects (e.g., a simple polyhedron, such as a cube, tetrahedron, or icosahedron, or a more complicated object such as a helix, trefoil knot, Lissajous knot, torus, torus knot, or hyperbolic knot) from which the object to be rendered is selected. In addition, the three-dimensional rendering of the object also may be animated, which can advantageously make replication of the image more difficult. For example, parameters may specify a camera location, a camera path, an object rotation direction, an object translation, and/or an object rotation speed. Any suitable combination of one or more of these parameters may be fixed or variable. The three-dimensional object can be rendered based on these parameters using a suitable application programming interface such as OpenGL or Direct3D.

In this example, server 612 generates a parametrically-generated graphical representation of a credential for companion 610. Server 612 transmits, to companion device 608, the parametrically-generated graphical representation of a credential. In response, companion device 608 displays the parametrically-generated graphical representation for signer 606. Using signer device 604, signer 606 may scan into signer device 604 the parametrically-generated graphical representation.

In this example, signer device 604 transmits, to server 612, information indicative of the parametrically-generated graphical representation. In response, server 612 compares the parametrically-generated graphical representation with valid representations for credentials for companion 610. In the example, one of the valid representations matches the parametrically-generated graphical representation, and therefore the parametrically-generated graphical representation is validated.

In still another example, server 612 generates animated graphical representations for credentials. In this example, data repository 618 stores multiple animated graphical representations. The animated graphical representations may be, for example, hypertext markup language (HTML) animations, animated graphical interchange formation (GIF) files, Motion Pictures Expert Group (MPEG) files, Adobe Flash® animations, or any combination thereof An animation may be, for example, a sequence of images defined by one of these files.

In this example, server 612 may access the stored graphical representations by way of index values, where an index value may correspond to a single representation. For example, in examples where the representations are stored in a file system, an index value may correspond to a file name, for example, a uniform resource identifier (URI) to the file. In examples where the representations are stored in a database, the index value may correspond to a particular database entry. In some examples, multiple index values could identify one particular representation. For example, one index value could identify a file directory, and another could identify a particular file within that directory. In some examples, one index value could identify multiple representations, for example where the index value identifies a file directory including multiple representations. It should be appreciated that index values may identify graphical representations stored at any location. In this example, the graphical representations may be stored on client devices 604, 608, at server 612, in data repository 618 or at any other location accessible via network 602.

In operation, server 612 can use seed values (e.g., a credential identifier and a time) to generate an index value identifying a current graphical representation for a credential. The time can be a current timestamp (e.g., seconds or milliseconds from epoch) obtained from a timing device such as a hardware or software clock located at the client device. In some examples, the timing device can be synchronized with server 612, and/or with one or more additional servers that provide a master clock reference as described below. Additional seed values may be used, such as a user identifier and/or randomly generated numbers. When a user identifier is used as a seed value, the graphical representation for the credential may be specific to a particular user. When a randomly generated number is used, it may be stored by server 612 and associated with the credential identifier and a user or group identifier for additional security.

Server 612 may map the seed values to index values using any suitable technique. The technique may allow applications executing on different client devices to generate the same index values given the same input values (e.g., the same credential identifier and time). For example, the credential identifier could be used to seed a pseudo-random number generator function, and then the resulting value could be added to a value representing the time. In such cases, the pseudo-random number generator function may be configured so that different computers can generate the same value when they are called at substantially the same time and receive the same credential identifier as a seed value. The seed values can be concatenated, manipulated using mathematical functions, hashed using a hash function such as MD5, SHA-1 or SHA-2, subsampled to select a predetermined subset or subsets, or any combination of these techniques to generate a suitable number of parameters.

In FIG. 6, server 612 validates an animated graphical representation by comparing it with a valid representation for a credential for companion 610. If the animated graphical representation matches the valid representation, server 612 validates that signer 606 is in the presence of companion 610.

In still another example, server 612 generates representations of phrases corresponding to credentials. Generally, a phrase includes a sequence of two or more words selected from one or more dictionaries of words. A phrase need not form a grammatical construct. A dictionary as used herein is a data structure in which index values identify words. A given dictionary may include many thousands or more different words.

Server 612 accesses contents of an electronic dictionary that is stored in data repository 618, e.g., by way of index values, where an index value can identify a single word or a group of words. For example, in examples where the words are stored in a property list, an index value may correspond to a key that stores a word as its value. In examples where the words are stored in a database, the index value may correspond to a particular database entry. In some examples, multiple index values could identify one particular word or group of words. For example, one index value could identify a specific dictionary (e.g., one hashmap in a collection of hashmaps), and another index value could identify a particular word within that dictionary (e.g., a key from the identified hashmap). In some examples, one index value could identify multiple words, for example where the index value identifies a group of words.

In operation, server 612 can use seed values (e.g., a credential identifier and a time) to generate one or more index values identifying a phrase for a credential. The time can be a current timestamp (e.g., seconds or milliseconds from epoch) obtained from a timing device such as a hardware or software clock located at the client device. In some examples, the timing device can be synchronized with server 612, and/or with one or more additional servers that provide a master clock reference as described below. Additional seed values may be used, such as a user identifier, a group identifier, and/or randomly generated numbers. When a user identifier is used as a seed value, a phrase representative of a credential may be specific to a particular user. When a group identifier is used, a phrase representative of a credential may be specific to a particular group. When a randomly generated number is used, it may be stored by server 612 and associated with the credential identifier for additional security.

Server 612 may map the seed values to index values using any suitable technique. The technique may allow applications executing on different client devices to generate the same index values given the same input values (e.g., the same credential identifier and time).

For example, the credential identifier could be used to seed a pseudo-random number generator function, and then the resulting value could be added to a value representing the time. In such cases, the pseudo-random number generator function may be configured so that different computers can generate the same value when they are called at substantially the same time and receive the same credential identifier as a seed value. The seed values can be concatenated, manipulated using mathematical functions, hashed using a hash function such as MD5, SHA-1 or SHA-2, subsampled to select a predetermined subset or subsets, or any combination of these techniques to generate a suitable number of index values.

A phrase can be transmitted from companion device 608 to signer device 604 in several ways. For example, companion device 608 could output an audio signal from a speaker corresponding to the phrase that would be received by signer device 604. This audio signal could be a human perceptible audible signal (e.g., a signal with frequency ranging from 20 Hz to 20 kHz), or it could be an ultrasonic signal (e.g., a signal with frequency that exceeds 20 kHz) that is detectable by a microphone on signer device 604. As another example, companion device 608 may transmit the phrase to signer device 604 using electronic radio-frequency communications, e.g., NFC or Bluetooth. In still another example, companion 610 could speak the phrase to signer 606.

Server 612 can validate a phrase in various manners. In an example, signer device 604 transmits information indicative of the phrase to server 612. In response, server 612 compares the information indicative of the phrase to information indicative of a valid phrase for companion 610. If server 612 identifies a match between the information indicative of the phrase and the information indicative of the valid phrase for companion 610, server 612 validates that companion 610 is in the presence of signer 606.

In the example of FIG. 6, data repository 618 stores electronic resource 620. In this example, electronic resource 620 is associated with condition 626. A user's ability to electronically sign (e.g., signer 606's ability to electronically sign) electronic resource 620 is restricted, e.g., until server 612 and/or signer device 604 detect that condition 626 is satisfied. Condition 626 may include various types of conditions, including, e.g., time based conditions, geographic location based conditions, conditions specifying that electronic resource 620 can be electronically signed if the signer is in the presence of a companion, and so forth.

In an example, condition 626 includes a time based condition, in which electronic resource 620 can only be electronically signed by signer 606 at predefined times (e.g., eleven pm) and/or within predefined time ranges (e.g., eleven pm to five am). In an example, condition 626 includes a geographic location based condition, in which electronic resource 620 can only be electronically signed by signer 606 when signer 606 (and/or signer device 604) is located at a predefined geographic location (e.g., Boston, Mass.).

In still another example, condition 626 specifies that electronic resource 620 can be electronically signed, by signer 606, if signer 606 is in the presence of a companion, including, e.g., companion 610. In this example, condition 626 specifies that the companion is required to be a specific person to enable electronic resource 620 to be unlocked. For example, condition 626 may include a list of names of specific people and/or other identifying information for specific people (e.g., user and/or credential identifiers for specific people). In another example, condition 626 specifies that the companion is required to hold a specific credential type to enable the document to be unlocked. In this example, condition 626 may specify that a companion is credentialed as an employee at a particular company, as a student at a particular educational institution, as having an account at a particular financial institution, as being a notary public, and so forth.

Condition 626 may also specify that companion 610 be queried for confirmation that companion 610 intends to enable electronic resource 620 to be unlocked for electronic signing by signer 606, e.g., before signer 606 is allowed to electronically sign electronic resource 620. In this example, server 612 may send, to companion device 608, a message prompting companion 610 to confirm that companion 610 intends to enable electronic resource 620 to be unlocked for electronic signing by signer 606. In this example, upon receipt of confirmation from companion 610 and upon satisfaction of other elements of condition 626, server 612 enables electronic signing of electronic resource 620, as described in further detail below.

In this example, signer 606 requests to access electronic resource 620 from data repository 618. In the example of FIG. 6, signer device 604 sends, to server 612, a request for electronic resource 620. In this example, electronic resource 620 is associated with condition 626, which specifies that electronic resource 620 can be electronically signed, by signer 606, if signer 606 is in the presence of companion 610. In response to the request, server 612 sends, to signer device 604, electronic resource 620, with electronic resource 620 being in a locked state.

In this example, signer device 604 receives electronic resource 620 in a locked state. In this example, signer 606 may verbally communicate to companion 610 that signer 606 needs companion 610 to unlock electronic resource 620, e.g., by enabling signer 606 to prove that signer 606 is in the presence of companion 610. In this example, companion 610 may use companion device 608 to request, from server 612, a credential of companion 610.

In response to companion 610 requesting the credential, server 612 transmits, to companion device 608, credential representation 628. In this example, credential representation 628 includes a representation of a credential for companion 610. Credential representation 628 may include one or more of a numeric representation, an ultrasonic audio signal representation, an animated graphical representation, a parametrically-generated graphical representation, an audio representation of a phrase and an optical machine-readable representation.

Server 612 identifies companion device 608 using various techniques. In an example, server 612 identifies companion device 608 based on the request (for a credential) that companion device 608 sends to server 612. In another example, prior to the request for access to electronic resource 620, signer 606 sends to server 612 companion information, e.g., information identifying one or more companions of signer 606. The companion information may include email addresses, mobile telephone numbers, and so forth. In response to the request from signer 606 for access to electronic resource 620, server 612 accesses companion information for signer 606. Server 612 may send, to various companion devices, preliminary messages requesting that the companions specify whether they are in proximity to signer 606. Based on the responses to the preliminary messages, server 612 sends credential representation 628 to those companion devices that are used by companions who specified that they are in proximity to signer 606.

In still another example, companion device 608 may request, from server 612, a credential identifier for a credential associated with companion 610. In this example, the request may include a user identifier that is associated with companion 610. Using the user identifier, server 612 determines a credential identifier that is associated with the user identifier in data repository 618.

In this example, server 612 transmits to companion device 608 the credential identifier. Using the credential identifier, companion device 608 generates credential representation 628, e.g., using one of the above-described techniques for the various types of representations.

In the example of FIG. 6, companion device 608 transfers credential representation 628 to signer device 604 and/or presents credential representation 628 to signer 606. In an example, credential representation 628 includes a numeric representation. In this example, companion 610 transfers credential representation 628 to signer 606, e.g., by showing signer 606 the numeric representation that is displayed on companion device 608. In response, signer 606 enters (e.g., types) the numeric representation into signer device 606, e.g., for subsequent transfer to server 612.

In another example, credential representation 628 includes a QR code. In this example, signer 606 uses signer device 604 to scan (e.g., photograph) into signer device 604 the QR code for companion 610. In still another example, companion device 608 may transfer credential representation 628 to signer device 604 using NFC, ultrasonic audio signals, or others of the above-described techniques.

In the example of FIG. 6, signer device 604 receives credential representation 628. In response, signer device 604 transmits credential representation 628 (and/or information indicative of credential representation 628) to server 612. Using credential representation 628 (and/or information indicative of credential representation 628), server 612 validates that companion 610 is in the presence of signer 606.

For example, credential representation 628 may include an identifier (e.g., a credential identifier, a user identifier, and so forth) for companion 610. In another example, when signer device 604 transmits credential representation 628 to server 612, signer device 604 also transmits the identifier for companion 610. Using the identifier, server 612 identifies, in data repository 618, representations of credentials for companion 610. In this example, data repository 618 stores representations of credentials in association with identifier. In this example, server 612 compares credential representation 628 to the stored representations of credentials. If server 612 determines a match between credential representation 628 and one of the stored representations, server 612 confirms that companion 610 is in the presence of signer 606.

In another example, server 612 identifies a credential type for credential representation 628. In this example, server 612 uses the credential identifier for companion 610 to generate (e.g., in real-time) a representation of a credential of the identified type, e.g., using the techniques described above for generation of various types of representations of credentials. In this example, server 612 compares credential representation 628 to the generated representation of the credential. If server 612 determines a match between credential representation 628 and the generated representation of the credential, server 612 confirms that companion 610 is in the presence of signer 606.

Based on confirmation of companion 610 being in the presence of signer 606, server 612 determines that condition 626 for electronic resource 620 is satisfied. Based on satisfaction of condition 626, server 612 transitions electronic resource 620 to an unlocked state for electronic signing by signer 606. In this example, server 612 transmits electronic resource 620 to signer device 604 for electronic signing by signer 606. In another example, server 612 stores in data repository 618 a private key (not shown) of the signer 604. In this example, the private key is held in escrow, e.g., in which use of the private key is restricted, until condition 626 is satisfied. Responsive to validating the credential of companion 610, server 612 may enable signer 606 to request that server 612 sign electronic resource 620 on behalf of signer 606, e.g., using the private key of signer that is held in escrow by server 612.

In an example, server 612 may record information identifying companion 610 who facilitates the unlocking of electronic resource 620. As previously described, server 612 may use a credential identifier of companion 610 in validating credential representation 628. In this example, data repository 618 stores the credential identifier, e.g., in association with a user identifier for companion 610. Based on the association between the credential identifier and the user identifier, server 612 uses the credential identifier to identify the user identifier for companion 610. In this example, server 612 generates an entry in data repository 618, with the entry specifying that electronic resource 620 was unlocked. Server 612 generates an association between the entry and the user identifier for companion 610, e.g., to record information specifying that companion 610 facilitated the unlocking of electronic resource 620.

In a variation of FIG. 6, electronic resource 620 may be stored locally on signer device 604. In this example, electronic resource 620 may have a signature field that may transition between a locked state and an unlocked state. In this example, after validating the credential of companion 610, server 612 may transmit message 630 to signer device 604. Message 630 includes information that causes the signature field in electronic resource 620 to be unlocked, thereby enabling signer 606 to electronically sign electronic resource 620.

In still another variation of FIG. 6, signer device 604 is configured to validate credential representation 628, e.g., without interaction with server 612. In this example, signer device 604 has access to valid representations that are stored in data repository 618 and/or in other data repositories or signer device 604 otherwise may be able to generate such valid representations to confirm the validity of credential representation 628.

Figure 7:
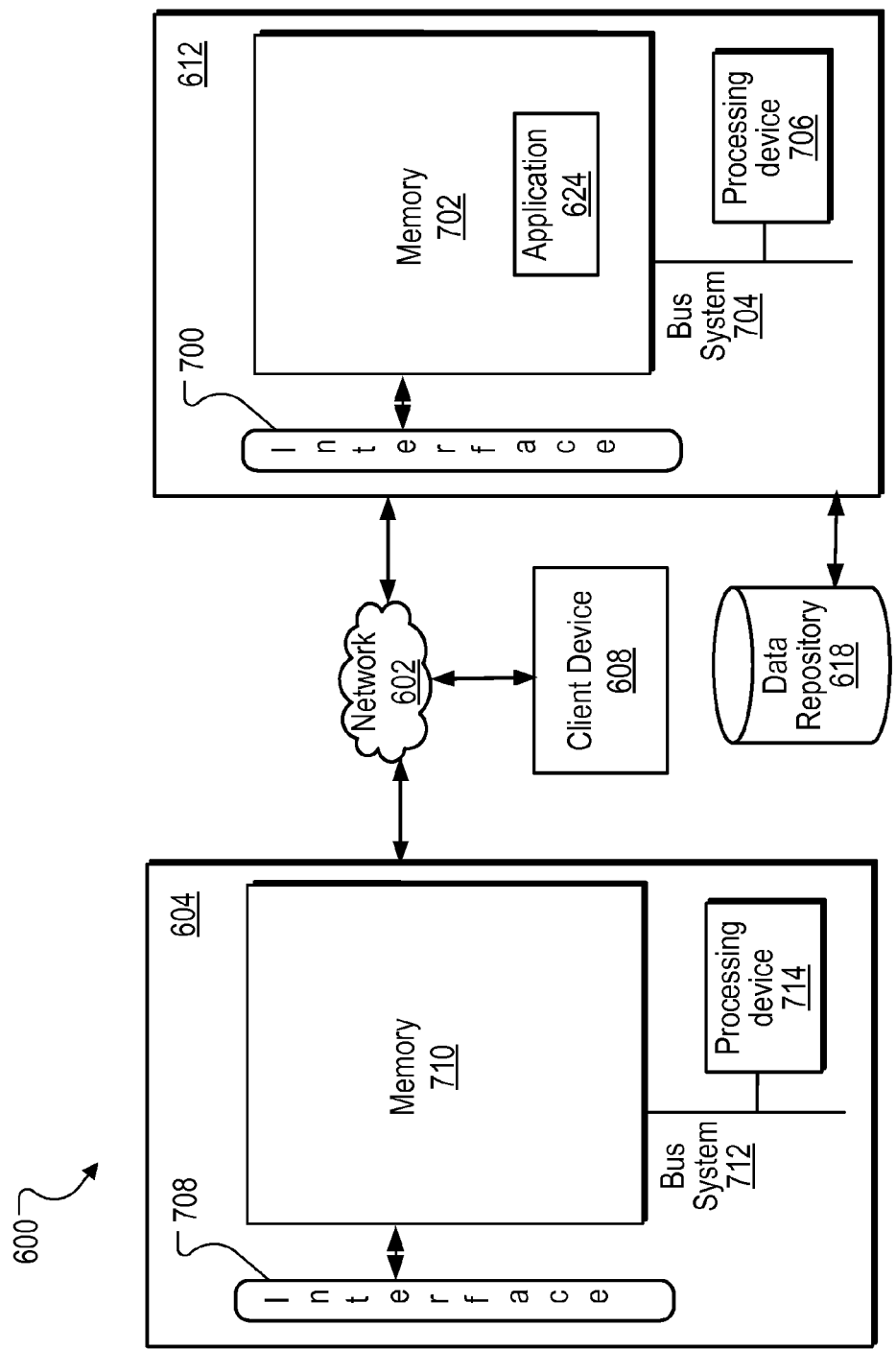
FIG. 7 is a block diagram showing examples of components of a network environment that enables unlocking of electronic resources based on satisfaction of conditions.

FIG. 7 is a block diagram showing examples of components of network environment 600 that enables unlocking of electronic resources based on satisfaction of conditions.

Server 612 can be a variety of computing devices capable of receiving data and running one or more services, including, e.g., application 624, which can be accessed by client devices 604, 608. In an example, server 612 can include a distributed computing system, a desktop computer, a laptop, a cell phone, a rack-mounted server, and the like. Server 612 can be a single server or a group of servers that are at a same position or at different positions. Server 612 and each of client devices 604, 608 can execute programs having a client-server relationship to each other. Although distinct modules are shown in FIG. 7, in some examples, client and server programs can execute on the same device.

Server 612 can receive data from client devices 604, 608 through input/output (I/O) interface 700. I/O interface 700 can be a type of interface capable of receiving data over a network, including, e.g., an Ethernet interface, a wireless networking interface, a fiber-optic networking interface, a modem, and so forth. Server 612 also includes a processing device 706 and memory 702. A bus system 704, including, for example, a data bus and a motherboard, can be used to establish and to control data communication between the components of server 612.

Processing device 706 can include one or more microprocessors. Generally, processing device 706 can include an appropriate processor and/or logic that is capable of receiving and storing data, and of communicating over a network (not shown). Memory 702 can include a hard drive and a random access memory storage device, including, e.g., a dynamic random access memory, or other types of non-transitory machine-readable storage devices. As shown in FIG. 7, memory 702 stores computer programs that are executable by processing device 706. These computer programs may include application 624 for implementing the operations and/or the techniques described herein. Application 624 can be implemented in software running on a computer device (e.g., server 612), hardware or a combination of software and hardware.

In the example of FIG. 7, client device 604 can be a variety of computing devices capable of receiving data and running one or more services, including, e.g., an application (not shown). In an example, client device 604 can include a server, a distributed computing system, a desktop computer, a laptop, a tablet, a smart phone, a cell phone, a rack-mounted server, and the like.

Client device 604 can receive data from client device 608 and from server 612 through I/O interface 708. I/O interface 708 can be a type of interface capable of receiving data over a network, including, e.g., an Ethernet interface, a wireless networking interface, a fiber-optic networking interface, a modem, and so forth. Client device 604 also includes a processing device 714 and memory 710. A bus system 712, including, for example, a data bus and a motherboard, can be used to establish and to control data communication between the components of client device 604.

Processing device 714 can include one or more microprocessors. Generally, processing device 714 can include an appropriate processor and/or logic that is capable of receiving and storing data, and of communicating over a network (not shown). Memory 710 can include a hard drive and a random access memory storage device, including, e.g., a dynamic random access memory, or other types of non-transitory machine-readable storage devices. As shown in FIG. 7, memory 710 stores computer programs that are executable by processing device 714. These computer programs may include an application (not shown) for implementing the operations and/or the techniques described herein. The application can be implemented in software running on a client device 604, hardware or a combination of software and hardware.

Figure 8:
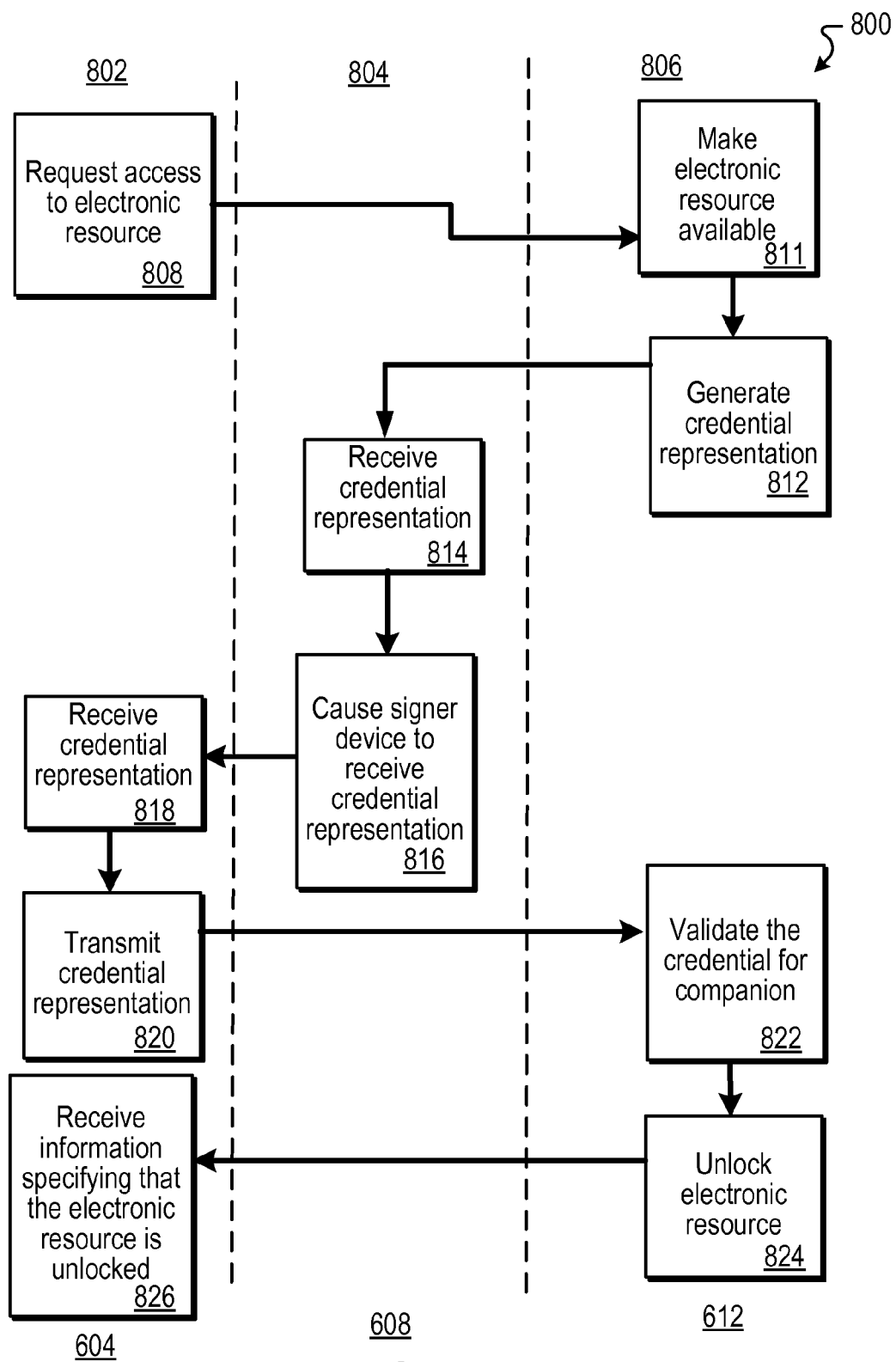
FIG. 8 is a flowchart showing an example of a process for unlocking of electronic resources based on satisfaction of conditions.

FIG. 8 is a flowchart showing an example of a process 800 for unlocking of electronic resources based on satisfaction of conditions. In FIG. 8, process 800 is split into parts 802, 804, 806. Part 802 may be performed by signer device 604 (and/or by an application running on signer device 604). Part 804 may be performed by companion device 608 (and/or by an application running on companion device 608). Part 806 may be performed by server 612 (and/or by application 624).

In operation, signer device 604 requests (808), from server 612, access to electronic resource 620. In response, server 612 makes (811) electronic resource 620 available to signer 606 in a locked state.

In the example of FIG. 8, server 612 also generates (812) credential representation 628. In a variation of FIG. 8, server 612 may generate credential representation 628 substantially in parallel with server 612 making electronic resource 620 available to signer 606. Server 612 transmits credential representation 628 to companion device 608, and companion device 608 receives (814) credential representation 628. Companion device 608 also causes (816) signer device 604 to receive credential representation 628. For example, when credential representation 628 includes a QR code, a display screen of companion device 608 may display the QR code. In this example, signer device 604 receives credential representation 628 by signer 606 using a scanner to scan the QR code into signer device 604.

In this example, signer device 604 receives (818) credential representation 628 (and/or information indicative of credential representation 628). In response, signer device 604 transmits (820) credential representation 628 (and/or information indicative of credential representation 628) to server 612, e.g., for validation of the credential of companion 610, which in turn, validates that companion 610 is in the presence of signer 606. Server 612 validates (822) that the credential represented by credential representation 628 is for companion 610. As previously described, server 612 may validate the credential of companion 610 by comparing credential representation 628 to one or more valid representations of credentials for companion 610. If server 612 determines a match between credential representation 628 and one of the valid representations of credentials for companion 610, server 612 validates credential representation 628 as representing a valid credential of companion 610. Based on the validation of credential representation 628, server 612 confirms that companion 610 is in the presence of signer 606 (or that signer 606 has received companion 610's authorization to electronically sign electronic resource 620), e.g., because in order for companion device 608 to transmit credential representation 628 to signer device 604 using one of the above-described techniques, companion device 608 (and/or companion 610) may need to be in proximity (e.g., geographic closeness) to and/or communication with signer device 604.

Following validation of credential representation 628, server 612 unlocks (824) electronic resource 620 for electronic signing by signer 606 and transmits, to signer device 604, information specifying that electronic resource 620 is unlocked for electronic signing. Signer device 604 receives (826) the information specifying that electronic resource 620 is unlocked. In response, signer 606 may sign electronic resource 620, e.g., may electronically sign a signature field in electronic resource 620. In another example, signer 606 may request that server 612 electronically sign electronic resource 620 on behalf of signer 606, e.g., using a private key of signer 606, as described above.

In a variation of FIG. 8, companion device 608 may generate the credential representation, e.g., rather than receiving the credential representation from server 612. In this example, companion device 608 may generate the credential representation using information received from server 612. The received information may include a credential identifier of a credential associated with a companion using companion device 608.

Examples of the subject matter and the functional operations described in this specification can be implemented in electronic circuitry, in tangibly-embodied computer software or firmware, in computer hardware, including the structures disclosed in this specification and their structural equivalents, or in combinations of one or more of them. Examples of the subject matter described in this specification can be implemented as one or more computer programs, i.e., one or more modules of computer program instructions encoded on a tangible program carrier for execution by, or to control the operation of, a processing device. Alternatively or in addition, the program instructions can be encoded on a propagated signal that is an artificially generated signal, e.g., a machine-generated electrical, optical, or electromagnetic signal that is generated to encode data for transmission to suitable receiver apparatus for execution by a processing device. The machine-readable medium can be a machine-readable storage device, a machine-readable storage substrate, a random or serial access memory device, or a combination of one or more of them.

The term "processing device" encompasses all kinds of apparatus, devices, and machines for processing data, including by way of example a programmable processor, a computer, or multiple processors or computers. The processing device can include special purpose logic circuitry, e.g., an FPGA (field programmable gate array) or an ASIC (application-specific integrated circuit). The processing device can also include, in addition to hardware, code that creates an execution environment for the computer program in question, e.g., code that constitutes processor firmware, a protocol stack, a database management system, an operating system, or a combination of one or more of them.

A computer program (which may also be referred to as a program, software, an application, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal electronic assistant (PDA), a mobile audio or video player, a game console, a Global Positioning System (GPS) receiver, or a portable storage device (e.g., a universal serial bus (USB) flash drive), to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, examples of the subject matter described in this specification can be implemented on a computer having a display device, e.g., a CRT (cathode ray tube) or LCD (liquid crystal display) monitor, for displaying data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Examples of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of electronic data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any of what may be claimed, but rather as descriptions of features that may be specific to particular examples. Certain features that are described in this specification in the context of separate examples can also be implemented in combination in a single implementation. Conversely, various features that are described in the context of a single implementation can also be implemented in multiple examples separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the examples described above should not be understood as requiring such separation in all examples, and it should be understood that the described program components and systems can generally be integrated together in a single software product or packaged into multiple software products.

Particular examples of the subject matter have been described. Other examples are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain examples, multitasking and parallel processing may be advantageous.

What is claimed is:

1. A method, comprising:
   receiving, at a server device and from a client device associated with a first user, a request on behalf of the first user to access an electronic resource;
   responsive to receiving the request on behalf of the first user to access the electronic resource, enabling the client device associated with the first user to access the electronic resource;
   while the client device associated with the first user is accessing the electronic resource,
      receiving, at the server device and from the client device associated with the first user, a request to validate a representation of a credential purported to represent another user received by the client device;
   validating the received representation of the credential as representing a second user; and
   responsive to validating the received representation of the credential, unlocking the electronic resource for the first user.

2. The method of claim 1, wherein unlocking of the electronic resource is conditioned on the representation of the credential being for a specific user;
   wherein validating the received representation of the credential includes determining that the second user is the specific user; and
   wherein unlocking the electronic resource includes enabling the first user to modify or to execute a transaction via the electronic resource, as a consequence of having determined that the second user is the specific user.

3. The method of claim 1, wherein unlocking of the electronic resource is conditioned on the representation of the credential being for a specific credential type;
   wherein validating the received representation of the credential includes determining that the credential is of the specific credential type; and
   wherein unlocking the electronic resource includes enabling the first user to modify the electronic resource as a consequence of having determined that the credential is of the specific credential type.

4. The method of claim 1, further comprising:
   transmitting a request for approval from the second user to another client device associated with the second user before unlocking the electronic resource; and
   receiving an indication of approval by the second user from the other client device associated with the second user, wherein unlocking the electronic resource includes enabling the first user to modify the electronic resource as a consequence of having received the indication of approval by the second user from the other client device associated with the second user.

5. The method of claim 1, wherein unlocking the electronic resource comprises:
   using a private key held in escrow for the first user, by the server device, to unlock the electronic resource on behalf of the first user.

6. The method of claim 1, wherein unlocking the electronic resource comprises:
   transmitting the electronic resource to the client device associated with the first user.

7. The method of claim 1, wherein at least a portion of the electronic resource is in a locked state, prior to validation of the received representation of the credential, and wherein the method further comprises:
   following validation, updating at least the portion of the electronic resource to an unlocked state; and
   recording information identifying the second user represented by the credential as the user who unlocked at least the portion of the electronic resource.

8. The method of claim 1, wherein unlocking the electronic resource enables execution of a transaction.

9. One or more machine-readable hardware storage devices storing instructions that are executable by one or more processing devices to perform operations comprising:
   receiving, from a client device associated with a first user, a request on behalf of the first user to access an electronic resource;
   responsive to receiving the request on behalf of the first user to access the electronic resource, enabling the client device associated with the first user to access the electronic resource;
   while the client device associated with the first user is accessing the electronic resource,
      receiving, from the client device associated with the first user, a request to validate a representation of a credential purported to represent another user received by the client device;
   validating the received representation of the credential as representing a second user; and
   responsive to validating the received representation of the credential, unlocking the electronic resource for the first user.

10. The one or more machine-readable hardware storage devices of claim 9, wherein unlocking of the electronic resource is conditioned on the representation of the credential being for a specific user;
    wherein validating the received representation of the credential includes determining that the second user is the specific user; and
    wherein unlocking the electronic resource includes enabling the first user to modify or to execute a transaction via the electronic resource, as a consequence of having determined that the second user is the specific user.

11. The one or more machine-readable hardware storage devices of claim 9, wherein unlocking of the electronic resource is conditioned on the representation of the credential being for a specific credential type;
    wherein validating the received representation of the credential includes determining that the credential is of the specific credential type; and
    wherein unlocking the electronic resource includes enabling the first user to modify the electronic resource as a consequence of having determined that the credential is of the specific credential type.

12. The one or more machine-readable hardware storage devices of claim 9, wherein the operations further comprise:
    transmitting a request for approval from the second user to another client device associated with the second user before unlocking the electronic resource; and
    receiving an indication of approval by the second user from the other client device associated with the second user, wherein unlocking the electronic resource includes enabling the first user to modify the electronic resource as a consequence of having received the indication of approval by the second user from the other client device associated with the second user.

13. The one or more machine-readable hardware storage devices of claim 9, wherein unlocking the electronic resource comprises:
    using a private key held in escrow for the first user, by the server device, to unlock the electronic resource on behalf of the first user.

14. The one or more machine-readable hardware storage devices of claim 9, wherein unlocking the electronic resource comprises:

transmitting the electronic resource to the client device associated with the first user.

15. The one or more machine-readable hardware storage devices of claim 9, wherein at least a portion of the electronic resource is in a locked state, prior to validation of the received representation of the credential, and wherein the operations further comprise:

following validation, updating at least the portion of the electronic resource to an unlocked state; and recording information identifying the second user represented by the credential as the user who unlocked at least the portion of the electronic resource.

16. The one or more machine-readable hardware storage devices of claim 9, wherein unlocking the electronic resource enables execution of a transaction.

17. An electronic system comprising:

one or more processing devices; and one or more machine-readable hardware storage devices storing instructions that are executable by the one or more processing devices to perform operations comprising:

receiving, from a client device associated with a first user, a request on behalf of the first user to access an electronic resource;

responsive to receiving the request on behalf of the first user to access the electronic resource, enabling the client device associated with the first user to access the electronic resource;

while the client device associated with the first user is accessing the electronic resource, receiving, from the client device associated with the first user, a request to validate a representation of a credential purported to represent another user received by the client device;

validating the received representation of the credential as representing a second user; and responsive to validating the received representation of the credential, unlocking the electronic resource for the first user.

18. The electronic system of claim 17, wherein unlocking of the electronic resource is conditioned on the representation of the credential being for a specific user;

wherein validating the received representation of the credential includes determining that the second user is the specific user; and wherein unlocking the electronic resource includes enabling the first user to modify or to execute a transaction via the electronic resource, as a consequence of having determined that the second user is the specific user.

19. The electronic system of claim 17, wherein unlocking of the electronic resource is conditioned on the representation of the credential being for a specific credential type;

wherein validating the received representation of the credential includes determining that the credential is of the specific credential type; and wherein unlocking the electronic resource includes enabling the first user to modify the electronic resource as a consequence of having determined that the credential is of the specific credential type.

20. The electronic system of claim 17, wherein unlocking the electronic resource enables execution of a transaction.

* * * * *